United States Patent
Owens

[11] Patent Number: 5,898,105
[45] Date of Patent: Apr. 27, 1999

[54] LEAK DETECTION APPARATUS FOR TUBULAR FLUID LINES WITH FITTINGS

[76] Inventor: Carl H. Owens, 5105-302 Phillips Hwy., Jacksonville, Fla. 32207

[21] Appl. No.: 08/729,648

[22] Filed: Oct. 21, 1996

[51] Int. Cl.⁶ .................................................. G01M 3/04
[52] U.S. Cl. ................................. 73/49.8; 73/40; 73/46; 73/49.1
[58] Field of Search ................... 73/49.1, 49.5, 73/40.5 R, 40, 46, 49.8

[56] References Cited

U.S. PATENT DOCUMENTS

| | | | |
|---|---|---|---|
| 1,422,522 | 7/1922 | Bareiss | 73/49.5 |
| 1,637,956 | 8/1927 | Moriarty | 73/49.5 |
| 3,334,515 | 8/1967 | Kost | 73/49.5 |
| 3,460,376 | 8/1969 | Kemp | 73/49.1 |
| 4,858,464 | 8/1989 | Miller et al. | 73/49.5 |

FOREIGN PATENT DOCUMENTS

| | | | |
|---|---|---|---|
| 1289969 | 9/1972 | United Kingdom | 73/49.1 |
| 2197490 | 5/1988 | United Kingdom | 73/49.1 |

*Primary Examiner*—Michael Brock
*Assistant Examiner*—Daniel S. Larkin
*Attorney, Agent, or Firm*—Thomas C. Saitta

[57] ABSTRACT

An apparatus for detecting leaks in fluid lines having any type, size, or style of fitting, the apparatus comprising in general a source of pressurized gas which is delivered into the fluid line to be tested. The fluid line is sealed on one end by a blanking plug mounted in a bracket, where the blanking plug sealingly mates with any type of fitting. The other end of the fluid line is connected to the gas source by an injector plug mounted in a bracket, the injector plug also sealingly mating with any type of fitting.

20 Claims, 2 Drawing Sheets

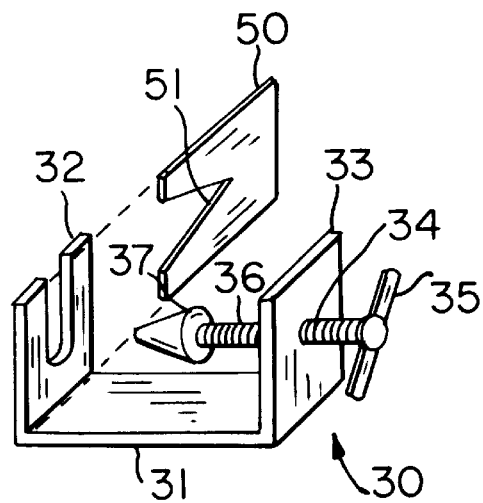
FIG. 2
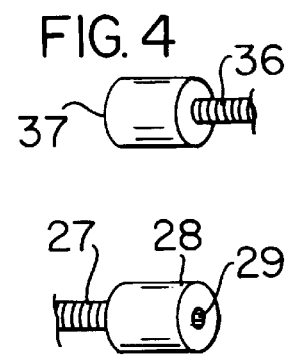
FIG. 4
FIG. 5
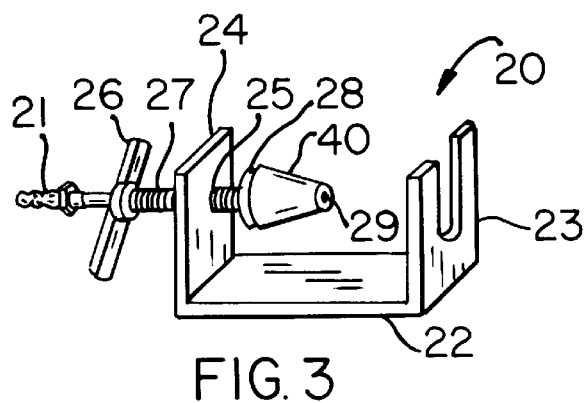
FIG. 3
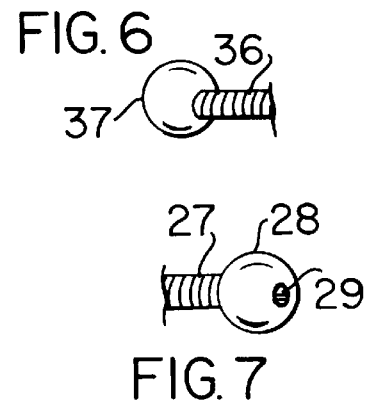
FIG. 6
FIG. 7

LEAK DETECTION APPARATUS FOR TUBULAR FLUID LINES WITH FITTINGS

BACKGROUND OF THE INVENTION

This invention relates generally to the field of equipment used to test fluid lines, such as hosing or tubing used to convey gases or liquids. More particularly, the invention relates to such equipment used to detect leaks or improper connection of fittings in high pressure fluid lines by introducing a gas under relatively high pressure into the fluid line and monitoring the line for a loss in pressure. Even more particularly, the invention relates to such equipment which provides easily connected and disconnected universal plug-type fittings which seal the open ends of the fluid line being tested.

There are a multitude of situations where it is required or at least desirable to test fluid lines for leaks. The fluid lines to be tested may be attached to operating equipment, may be removable for testing, or may have been newly fabricated. Fluid lines may be conduits for air, gases, water, fuel, hydraulic fluid, oil, etc., and may be fabricated of polymers, rubber, or metal such as steel or aluminum, which have permanently attached fittings, typically threaded or snap-fit, for connecting the fluid lines to other components of the operating system. Known systems for testing fluid lines for leaks using high pressure gas typically require a large number of connector fittings, since the fluid line fittings may comprise any of a large number of varying styles and sizes. The fittings on the fluid line have to be matched with comparable fittings on the testing equipment.

It is an object of this invention to provide for a fluid line leak detection apparatus or system which is universal in adaptability, in that the apparatus or system can be used with any type of fitting or connector on any type of fluid conduit. It is a further object to provide such an apparatus or system which comprises means to seal the fluid line to be tested, means to deliver a gas at relatively high pressure into the fluid line, and means to detect a leak in the fluid line by indicating a loss of pressure within the sealed and pressurized line. It is a further object to provide such an apparatus or system which is quickly and readily connected and disconnected to any type of fitting, tube, or hose.

SUMMARY OF THE INVENTION

The invention is an apparatus for testing fluid lines, such as hoses or tubes, to detect leaks, and comprises in general means to seal the fluid line and means to deliver gas at relatively high pressure, for example 500 to 600 psi, into the fluid line. The gas delivery means comprises a pressurized tank with a supply conduit connecting it to a manifold assembly or housing containing a charge valve for opening and closing the tank, means to regulate the pressure of the gas delivered into the fluid line, and a charging conduit to introduce the gas into the fluid line through an injector means. The injector means is constructed to matingly seal one end of the fluid line regardless of the type of fittings or connectors present on the fluid line, and comprises a bracket having a slotted end to receive the fluid line and entrap the fitting and a threaded apertured end through which is mounted a threaded conduit connected by fittings to the supply conduit and ending in an injector plug. The injector plug is apertured to allow gas to flow from the threaded conduit into the fluid line, and is shaped either generally conically, spherically, or any other shape which would present a circular juncture line to the internal bore of the fitting of the fluid line, or cylindrically in order to sealingly mate with the fluid line fitting. The apparatus further comprises a blanking means used to seal off the remaining end of the fluid line, the blanking means being constructed similarly to the injector means, except that a threaded rod is used in the place of the threaded conduit to mount the blanking plug in the bracket, since the purpose of the blanking means is to seal the fluid line. The blanking plug may also be shaped either conically, spherically, or cylindrically. The injector plug and blanking plug are preferably comprised of a hard polymeric material, such as that sold under the brand name TEFLON, and may be coated with a softer polymer, such as a silicone or like material, in order to improve the seal. A secondary retainer member is preferably provided for one or both the slotted ends of the brackets, the retainer member having a slot of diminishing width which enables any combination of hose, tube, or fitting diameters to be retained within the brackets.

To test a fluid line, the blanking means is attached to one end of the fluid line by placing the hose or tube portion of the fluid line into the slotted end of the bracket such that the fitting is positioned between the slotted end and the blanking plug. If the fitting is smaller than the slot in the slotted end, the secondary retainer member is inserted transversely between the fitting and the slotted end a sufficient distance to retain the fitting within the bracket. The blanking plug is then advanced against the flat side (if a cylindrical configuration is used) or into the circular bore (if a conical or spherical configuration is used) of the fitting by rotating the handle until a tight seal is formed. The remaining end of the fluid line is placed into the slotted end of the injector means bracket and secured in the same manner by positioning the secondary retainer means if necessary and advancing the injector plug to create a sealed assembly. Gas at relatively high pressure is then introduced into the fluid line to reach a steady state pressure. The charging valve is then closed and the system monitored for any loss of pressure. At the end of the test, the gas is released by a dump valve and the fluid line is removed from the brackets.

BRIEF DESCRIPTION OF THE DRAWINGS

FIG. 2 is a view of the blanking means.

FIG. 3 is a view of the injector means.

FIG. 4 is a view of an alternative embodiment of the blanking plug.

FIG. 5 is a view of an alternative embodiment of the injector plug.

FIG. 6 is a view of another alternative embodiment of the blanking plug.

FIG. 7 is a view of another alternative embodiment of the injector plug.

DETAILED DESCRIPTION OF THE INVENTION

Figure 1:
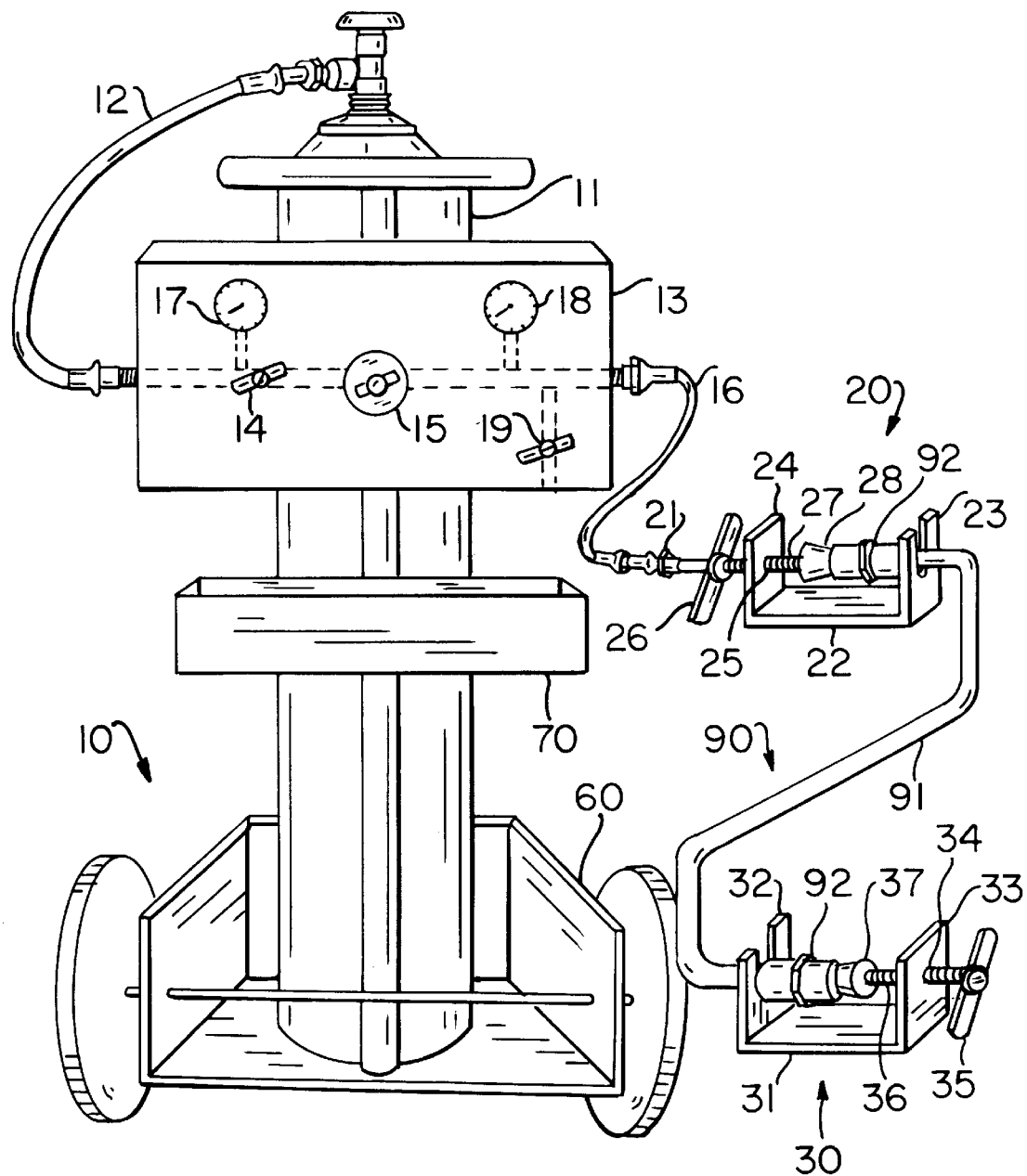
FIG. 1 is a view of the main components of the invention, with a fluid line in place for testing.

The invention will now be described in detail with regard for the best mode and preferred embodiment, with reference to the various drawings to better define the various components of the invention. In general, the invention is an apparatus or system for testing fluid lines for leaks, and in particular is for testing high pressure fluid lines. A fluid line is taken to be any suitable non-permeable conduit, such as a flexible, non-linear or linear tube or hose made of metal, rubber, synthetic polymers or any combination of these materials, for flow of gases or liquids, such as air, fuel, hydraulic fluid, or the like, which has a fitting or connectors attached to each end of the hose or tube, the fittings enabling the fluid line to be readily connected in a sealed manner with other components of an operating system or device. The apparatus can be used either to test fluid lines which have been in operation or to test fluid lines which are newly fabricated. The apparatus is constructed to be universal in application, such that any configuration type, or size of fluid line, having any size or type of fitting, can be easily and quickly tested for leaks.

Referring now to FIG. 1, the apparatus is shown to comprise gas delivery means 10, which is a combination of elements capable of delivering at relatively high pressure a gas into the fluid line 90 to be tested. Any suitable gas may be used, but preferably the chosen gas is relatively inert and harmless, such as nitrogen for example. Gas delivery means 10 comprises a pressurized gas source 11, such as a high pressure tank of common design known in the industry. A supply conduit 12, preferably a flexible high pressure hose, connects the gas delivery tank 10 to a manifold housing 13 for fluidly connecting the various components. A charging valve 14 is connected in line and is used to open and close gas flow from the tank 10. A source pressure gauge 17 is preferably connected in line to provide a visual indication of the pressure within the gas delivery means 10. The manifold housing 13 further comprises an in line pressure regulator 15 which is used to regulate the pressure of the gas within the fluid line 90. A test pressure gauge 18 is connected down line of the pressure regulator 15 to provide a visual indication of the pressure within the fluid line 90 being tested for leaks. A charging conduit 16 is connected to the outflow side of the manifold housing 13, the charging conduit 16 preferably comprising a suitable high pressure hose and ending in a fitting, preferably of a quick disconnect type, for connection to the injector means 20. A dump valve 19 is provided down line of the pressure regulator 15 and is used to release the gas from the fluid line 90 after the test has been completed. The various components of the gas delivery means 10 set forth above are well known in the industry, and standard valves, conduits, and gauges may be utilized. The components are all connected in fluid communication such that gas from the pressurized gas source 11 flows through the supply conduit 12, the charging valve 14, the pressure regulator 15, and the charging conduit 16, with the pressure of the gas within the gas supply source 11 indicated by source pressure gauge 17 and the pressure in the charging conduit 16, and therefore in the fluid line 90, indicated by the test pressure gauge 18. Preferably, the gas delivery means 10 is capable of delivering a gas at sufficient pressure to achieve up to 600 psi within the fluid line 90. The gas delivery means may comprise a wheeled dolly or handtruck 60 for ease in movement of the apparatus, as well as a tray 70 to retain tools or other items.

In order to test a fluid line 90 for leaks, gas must be delivered into one end of the fluid line 90 while the other end of the fluid line 90 is closed off. To seal off one end of the fluid line 90, universal blanking means 30 is provided, as shown in FIG. 2. The fluid line 90 comprises a conduit 91 and two fittings or connectors 92. These fittings 92 may vary greatly in size and configuration depending upon the corresponding fitting to which the fluid line 90 is to be attached. The blanking means 30 is constructed such that it is capable of sealing the opening at the fitting 92, regardless of the particular type or size of fitting 92. To accomplish this, blanking means 30 comprises a bracket 31 having two opposing, generally parallel ends, one a slotted end 32 with a generally U-shaped slot and the other an apertured end 33 containing a threaded aperture 34. A threaded rod 36 is mounted through the threaded aperture 34, the rod 36 having a handle 35 for rotating the rod 36 positioned on the outside of the bracket 31. To the other end of the threaded rod 36 is mounted a blanking plug member 37, the blanking plug 37 being either of a configuration which presents a circular or annular juncture to the internal bore of the fitting, such as preferably conical as seen in FIG. 2 or spherical as seen in FIG. 6, or a cylindrical configuration as seen in FIG. 4. The blanking plug 37 is composed of a hard material which is capable of providing a fluid-tight seal with the fitting 92 of the fluid line 90, and is preferably composed of a hard polymer such as the type sold under the brand name TEFLON. The blanking plug 37 may also comprise a relatively softer polymeric or rubber coating 40, such as a silicone, to improve the sealing characteristics.

To seal the end of the fluid line 90, the first fitting 92 is positioned internally within the slotted end 32 of the blanking means bracket 31 such that a portion of the fitting 92 having a larger outer diameter than that of the conduit 91, such as a tightening nut, abuts the interior side of the slotted end 32. The opening of the fitting 92 is aligned with the axis of the threaded rod 36 so that the blanking plug 37 will be compressed against the fitting 92 upon rotation of the handle means 35. For most applications, a blanking plug 37 having a conical configuration is preferred and will provide a suitable fluid-tight seal when inserted into the internal opening of the fitting 92. As the blanking plug 37 is advanced into the bore of the fitting 92, the fitting 92 is pressed against the slotted end 32 of the bracket 31, which prevents movement of the fluid line 90 such that the blanking plug 37 becomes firmly seated within the fitting 92. For some fittings 92, a better seal may be achieved by using the blanking plug 37 having a cylindrical configuration, whereby the flat end presses against the flat exterior of the fitting 92 rather being forced into the interior opening. If the fitting 92 is smaller than the size of the opening in the slotted end 32 of the bracket 31, a secondary retainer sizing member 50 is utilized. The retainer member 50 is a generally planar member having an angled notch or slot 51 which diminishes in size from the outer edge toward the interior of the retainer member 50, as shown in FIG. 2. The small fitting 92 is positioned as before within the interior of the bracket 31 and the retainer member 50 is inserted transversely between the fitting 92 and the slotted end 32 such that the angled slot 51 receives the conduit 91. The retainer member 50 is fully advanced to contact the conduit 91, which thereby reduces the effective size of the slot in the slotted end 32 to a small enough size sufficient to retain the small fitting 92 when the blanking plug 37 is forced against or into the fitting 92.

The remaining end of the fluid line 90 is now connected to the charging conduit 16 of the gas delivery means 10 by a gas injector means 20, as shown in FIG. 3, which is somewhat similar in construction and operation to the blanking means 30, with the exception that the injector means 20 must provide a conduit for entry of gas into the fluid line 90. The injector means 20 comprises a bracket 22 having opposing, generally parallel ends, one of which is a slotted end 23 having a generally U-shaped slot and the other of which is an apertured end 24 having a threaded aperture 25 into which is mounted a threaded conduit 27. The exterior end of the threaded conduit 27 ends in a fitting 21 which is complementary to the fitting on the charging conduit 16, such that the injector means 20 and in particular the threaded conduit 27, may be fluidly connected to the charging conduit 16. A handle 26 is mounted to the threaded conduit 27 for rotating the threaded conduit 27 within the threaded aperture 25. To the interior end of the threaded conduit 27 is mounted an injector plug 28 having an internal gas delivery conduit or bore 29, the injector plug 28 being either of a configuration presenting a circular or annular juncture line to the internal bore or conduit of the fitting, such as conical as seen in FIG. 3 or spherical as seen in FIG. 7, or a cylindrical configuration as shown in FIG. 5. The injector plug 28 is also composed of a hard material which is capable of providing a fluid-tight seal with the fitting 92 of the fluid line 90, and is preferably composed of a hard polymer such as the type sold under the brand name TEFLON. The injector plug 28 may also comprise a relatively softer polymeric or rubber coating 40, such as a silicone, to improve the sealing characteristics.

To seal the other end of the fluid line 90 and to provide a means to introduce gas at high pressure into the fluid line 90, the second fitting 92 is positioned internally within the slotted end 23 of the injector means bracket 22 such that a portion of the fitting 92 having a larger outer diameter than that of the conduit 91, such as a tightening nut, abuts the interior side of the slotted end 23. The bore of the fitting 92 is aligned with the axis of the threaded conduit 27 so that the injector plug 28 will be compressed against the fitting 92 upon rotation of the handle means 26. For most applications, an injector plug 28 having a configuration presenting a circular or annular juncture line against the internal bore of a fitting, such as conical or spherical, is preferred and will provide a suitable fluid-tight seal when inserted into the internal bore of the fitting 92. As the injector plug 28 is advanced into the fitting 92, the fitting 92 is pressed against the slotted end 23 of the bracket 22, which prevents movement of the fluid line 90 such that the injector plug 28 is firmly seated within the fitting 92. For some fittings 92, a better seal may be achieved by using the injector plug 28 having a cylindrical configuration, whereby the flat end presses against the flat exterior of the fitting 92 rather being forced into the interior opening. If the fitting 92 is smaller than the size of the opening in the slotted end 23 of the bracket 22, a secondary retainer sizing member 50 is utilized. The retainer member 50 is a generally planar member having an angled notch or slot 51 which diminishes in size from the outer edge toward the interior of the retainer member 50. The small fitting 92 is positioned as before within the interior of the bracket 21 and the retainer member 50 is inserted transversely between the fitting 92 and the slotted end 23 such that the angled slot 51 receives the conduit 91. The retainer member 51 is fully advanced to contact the conduit 91, which thereby reduces the effective size of the slot in the slotted end 23 to a small enough size sufficient to retain the small fitting 92 when the injector plug 28 is forced against or into the fitting 92.

To test a fluid line 90 after it has been connected to the injector means 20 and blanking means 30 as described above, the charging valve 14 is opened to allow gas to flow from the pressurized gas source 11 into the pressure regulator 15, through the charging conduit 16, the threaded conduit 27, the delivery conduit 29 of the injector plug 28, and into the fluid line 90. The pressure regulator 15 is adjusted such that the pressure within the fluid line 90 is maintained preferably at approximately 500 psi or more if a high pressure hydraulic line is being tested, as this is the equivalent of approximately 2000 psi of hydraulic fluid, although other lesser values may be suitable for testing fluid lines to be used for different applications. Once this pressure is attained, the charging valve 14 is closed and the test pressure gauge 18 is monitored for a suitable period, such as ten minutes, to detect any drop in pressure within the fluid line 90. A drop in pressure would indicate that there is a leak in the conduit 91 or at the junctures of the fittings 92. Soapy water may be applied externally to the fluid line 90 being tested to provide a visual indicator of the location of a leak. Once the test is completed, the pressure is relieved by opening the dump valve 19 to vent the gas to atmosphere or a storage tank.

It is understood that equivalents or substitutions my be obvious for certain components of the invention as set forth above, and the full scope and definition of the invention therefore is to be as set forth in the following claims.

I claim:

1. An apparatus for testing a fluid line for leaks, the fluid line comprising a conduit with a first connector fitting on one end and a second connector fitting on the other end, the apparatus comprising a gas delivery means for delivering gas at high pressure to an injector means, a blanking means which sealingly mates with a first fitting on one end of a fluid line, and said injector means which sealingly mates with a second fitting on the other end of a fluid line and delivers said high pressure gas into said fluid line;

where said blanking means is independent of and disconnected from said injector means;

where said blanking means comprises a bracket for retaining said first fitting of said fluid line conduit and a blanking plug connected to said bracket for sealingly mating with said first fitting on said fluid line; and where said injector means comprises a bracket for retaining said second fitting of said fluid line conduit and an injector plug connected to said bracket for sealingly mating with said second fitting on said fluid line, said injector plug having a delivery conduit in fluid communication with said gas delivery means, whereby said high pressure gas is delivered through said delivery conduit into said fluid line.

2. The apparatus of claim 1, where said blanking plug has a configuration which presents a circular juncture line when mated with said first fitting on said fluid line.

3. The apparatus of claim 2, where said blanking plug has a conical configuration.

4. The apparatus of claim 2, where said blanking plug has a spherical configuration.

5. The apparatus of claim 1, where said injector plug has a configuration which presents a circular juncture line when mated with said second fitting on said fluid line.

6. The apparatus of claim 5, where said injector plug has a conical configuration.

7. The apparatus of claim 5, where said injector plug has a spherical configuration.

8. The apparatus of claim 1, where said blanking plug has a cylindrical configuration.

9. The apparatus of claim 1, where said injector plug has a cylindrical configuration.

10. An apparatus for testing a fluid line for leaks, the fluid line comprising a conduit with a first connector fitting on one end and a second connector fitting on the other end, the apparatus comprising a gas delivery means for delivering gas at high pressure to an injector means, a blanking means which sealingly mates with a first fitting on one end of a fluid line, and said injector means which sealingly mates with a second fitting on the other end of a fluid line and delivers said high pressure gas into said fluid line;

where said blanking means is independent of and disconnected from said injector means;

where said blanking means comprises a bracket having a slotted end to receive said fluid line conduit, said slotted end abutting said first fitting to retain said first fitting within said bracket, and an apertured end with a threaded aperture, a threaded rod mounted within said threaded aperture, a blanking plug mounted on said threaded rod for sealingly mating with said first fitting on said fluid line; and where said injector means comprises a bracket having a slotted end to receive said fluid line conduit, said slotted end abutting said second fitting to retain said second fitting within said bracket, and an apertured end with a threaded aperture, a threaded conduit mounted within said threaded aperture, a fitting mounted on said threaded conduit for connecting said threaded conduit to said gas delivery means, an injector plug mounted on said threaded conduit for sealingly mating with said second fitting on said fluid line, said injector plug having a delivery conduit in fluid communication with said gas delivery means, whereby said high pressure gas is delivered through said threaded conduit and said delivery conduit into said fluid line.

11. The apparatus of claim 10, where said blanking plug has a configuration which presents a circular juncture line when mated with said first fitting on said fluid line.

12. The apparatus of claim 11, where said blanking plug has a conical configuration.

13. The apparatus of claim 11, where said blanking plug has a spherical configuration.

14. The apparatus of claim 10, where said injector plug has a configuration which presents a circular juncture line when mated with said second fitting on said fluid line.

15. The apparatus of claim 14, where said injector plug has a conical configuration.

16. The apparatus of claim 14, where said injector plug has a spherical configuration.

17. The apparatus of claim 10, where said blanking plug has a cylindrical configuration.

18. The apparatus of claim 10, where said injector plug has a cylindrical configuration.

19. The apparatus of claim 10, further comprising a retainer sizing member having an angled slot which diminishes in size, where said retainer sizing member is positioned internally to said slotted end of said injector means to retain said second fitting of said fluid line.

20. The apparatus of claim 10, further comprising a retainer sizing member having an angled slot which diminishes in size, where said retainer sizing member is positioned internally to said slotted end of said blanking means to retain said first fitting of said fluid line.

* * * * *